United States Patent
Galle et al.

(10) Patent No.: US 12,361,214 B2
(45) Date of Patent: Jul. 15, 2025

(54) COMPUTER-IMPLEMENTED METHOD FOR DISTRIBUTIONAL DETECTION OF MACHINE-GENERATED TEXT

(71) Applicant: Naver Corporation, Gyeonggi-do (KR)

(72) Inventors: Matthias Galle, Eybens (FR); Hady Elsahar, Grenoble (FR); Joseph Rozen, Grenoble (FR); German Kruszewski, Saint Mandé (FR)

(73) Assignee: Naver Corporation, Gyeonggi-do (KR)

( * ) Notice: Subject to any disclaimer, the term of this patent is extended or adjusted under 35 U.S.C. 154(b) by 355 days.

(21) Appl. No.: 17/881,700

(22) Filed: Aug. 5, 2022

(65) Prior Publication Data
US 2023/0109734 A1    Apr. 13, 2023

Related U.S. Application Data

(60) Provisional application No. 63/254,063, filed on Oct. 9, 2021.

(51) Int. Cl.
*G06F 40/279* (2020.01)
*G06F 16/903* (2019.01)
(Continued)

(52) U.S. Cl.
CPC ...... *G06F 40/279* (2020.01); *G06F 16/90344* (2019.01); *G06F 16/93* (2019.01); *G06N 5/022* (2013.01)

(58) Field of Classification Search
CPC ...... G06F 40/279; G06F 40/117; G06F 16/93; G06F 16/90344; G06N 5/022; G06N 3/09; G06V 30/2455
See application file for complete search history.

(56) References Cited

U.S. PATENT DOCUMENTS 9,880,995 B2 *   1/2018   Chaski ............... G06F 40/237
9,953,031 B2 *   4/2018   Schilder ............. G06F 40/117
(Continued)

OTHER PUBLICATIONS

Daphne Ippolito, Daniel Duckworth, Chris Callison-Burch, Douglas Eck, "Automatic Detection of Generated Text is Easiest when Humans are Fooled", Jul. 5-10, 2020, pp. 1808-1822 (Year: 2020).*
(Continued)

*Primary Examiner* — Paras D Shah
*Assistant Examiner* — Nadira Sultana

(57) ABSTRACT

There is disclosed a computer-implemented method for detecting machine-generated documents in a collection of documents including machine-generated and human-authored documents. The computer-implemented method includes computing a set of long-repeated substrings (such as super-maximal repeats) with respect to the collection of documents and using a subset of the long-repeated substrings to designate documents containing the subset of the repeated substrings as machine-generated. The documents designated as machine-generated serve as positive examples of machine-generated documents and a set of documents including at least one human-authored document serves as negative examples of machine-generated documents. A plurality of classifiers are trained with a dataset including both the positive and negative examples of machine-generated documents. Classified output of the classifiers is then used to detect an extent to which a given document of the dataset is machine-generated.

13 Claims, 16 Drawing Sheets

(51) Int. Cl.
G06F 16/93 (2019.01)
G06N 5/022 (2023.01)

(56) References Cited

U.S. PATENT DOCUMENTS

| | | | | |
|---|---|---|---|---|
| 10,936,970 | B2* | 3/2021 | Guggilla | G06N 3/08 |
| 11,468,232 | B1* | 10/2022 | Rath | G06V 30/2455 |
| 11,694,460 | B1* | 7/2023 | Luo | G06N 3/09 382/176 |
| 2018/0314939 | A1* | 11/2018 | Skiles | G06F 3/04842 |
| 2020/0104799 | A1* | 4/2020 | Xiong | G06N 5/02 |
| 2022/0103589 | A1* | 3/2022 | Shen | H04L 67/01 |
| 2022/0108126 | A1* | 4/2022 | Schieber | G06N 20/00 |

OTHER PUBLICATIONS

Travis Gagie, Aleksi Hartikainen, Kalle Karhu, Juha Karkkainen, Gonzalo Navarro, Simon J. Puglisi, "Document retrieval on repetitive string collections", PubMed, 2017, pp. 253-291 • (Year: 2017).*

Enil Pajic and Vedran Ljubovic, "Improving Plagiarism Detection Using Genetic Algorithm", MIPRO 2019, May 20-24, 2019, Opatija Croatia (Year: 2019).*

Mohammad Zubair Khan, Omar Hussain Alhazmi, "Study and analysis of unreliable news based on content acquired using ensemble learning (prevalence of fake news on social media)", Jul. 2020, International Journal of System Assurance Engineering and Management, vol. 11, pp. 145-153 (Year: 2020).*

Romain Brixtel, "Maximal Repeats Enhance Substring-based Authorship Attribution, Proceedings of Recent Advances in Natural Language Processing", Sep. 2015, Proceedings of Recent Advances in Natural Language Processing, pp. 63-71, (Year: 2015).*

Abouelhoda, Mohamed Ibrahim; Kurtz, Stefan; and Ohlebusch, Enno. "Replacing Suffix Trees with Enhanced Suffix Arrays". Journal of Discrete Algorithms 2, vol. No. 1, pp. 53-86, Mar. 2004.

Bakhtin, Anton; Deng, Yuntian; Gross, Sam; Ott, Myle; Ranzato, Marc'Aurelio; and Arthur Szlam. "Residual Energy-Based Models for Text", Journal of Machine Learning Research, 22(40):1-41, 2021.

Bender, Emily M; Gebru, Timnit; McMillan-Major, Angelina; and Shmitchell, Shmargaret. "On the Dangers of Stochastic Parrots: Can Language Models Be Too Big?". In Proceedings of the 2021 ACM Conference on Fairness, Accountability, and Transparency, 610-23. Virtual Event Canada: ACM, 2021.

Brown, Tom B.; Mann, Benjamin; Ryder, Nick; Subbiah, Melanie; Kaplan, Jared; Dhariwal, Prafulla; Neelakantan, Arvind; et al. "Language Models Are Few-Shot Learners". Published on arXiv. org as 2005.14165v4, Jul. 22, 2020.

Buchanan, Ben; Lohn, Andrew; Musser, Micah; and Sedova, Katerina. "Truth, Lies, and Automation: How Language Models Could Change Disinformation". Center for Security and Emerging Technology, published on the Internet at doi.org/10.51593/2021CA003, May 2021.

Choi, Byung-Ju; Hong, Jimin; Park, David; and Lee, Sang Wan. "F-Softmax: Diversifying Neural Text Generation via Frequency Factorized Softmax". In Proceedings of the 2020 Conference on Empirical Methods in Natural Language Processing (EMNLP), pp. 9167-9182, 2020.

Clark, Elizabeth; August, Tal; Serrano, Sofia; Haduong, Nikita; Gururangan, Suchin; and Smith, Noah A. "All That's "Human" Is Not Gold: Evaluating Human Evaluation of Generated Text". In Proceedings of the 59th Annual Meeting of the Association for Computational Linguistics and the 11th International Joint Conference on Natural Language Processing (vol. 1: Long Papers), pp. 7282-7296, 2021.

Dathathri, Sumanth; Madotto, Andrea; Lan, Janice; Hung, Jane; Frank, Eric; Molino, Piero; Yosinski, Jason; and Liu, Rosanne. "Plug And Play Language Models: A Simple Approach To Controlled Text Generation". In International Conference on Learning Representations, 2020.

Devlin, Jacob; Chang, Ming-Wei; Lee, Kenton; and Toutanova, Kristina. "BERT: Pre-Training of Deep Bidirectional Transformers for Language Understanding". Published on arXiv.org as 1810.04805v2, May 24, 2019.

Dou, Yao; Forbes, Maxwell; Koncel-Kedziorski, Rik; Smith, Noah A.; and Choi, Yejin. "Scarecrow: A Framework for Scrutinizing Machine Text". Published on arXiv.org as 2107.01294v2, Jul. 6, 2021.

Dugan, Liam; Ippolito, Daphne; Kirubarajan, Arun; and Callison-Burch, Chris. "RoFT: A Tool for Evaluating Human Detection of Machine-Generated Text". Published on arXiv.org as 2010.03070v1, Oct. 6, 2020.

Fan, Angela; Lewis, Mike; and Dauphin, Yann. "Hierarchical Neural Story Generation". Published on arXiv.org as 1805.04833v1, May 13, 2018.

Gehrmann, Sebastian; Strobelt, Hendrik; and Rush, Alexander. "GLTR: Statistical Detection and Visualization of Generated Text". In Proceedings of the 57th Annual Meeting of the Association for Computational Linguistics: System Demonstrations, pp. 111-116. Florence, Italy, Jul. 28-Aug. 2, 2019.

GPT-3. "A robot wrote this entire article. Are you scared yet, human?". Published on the Internet at theguardian.com/commentisfree/2020/sep/08/robot-wrote-this-article-gpt-3, Sep. 8, 2020.

Gusfield, Dan. "Algorithms on stings, trees, and sequences: Computer science and computational biology". ACM SIGACT News, vol. 28, Issue 4, pp. 41-60, Dec. 1, 1997.

Holtzman, Ari; Buys, Jan; Du, Li; Forbes, Maxwell; and Choi, Yejin. "The Curious Case Of Neural Text Degeneration". Published on the Internet at openreview.net/pdf?id=rygGQyrFvH as a conference paper at ICLR, 2020.

Holtzman, Ari; Buys, Jan; Du, Li; Forbes, Maxwell; and Choi, Yejin. The Curious Case of Neural Text Degeneration. Published on arXiv.org as 1904.09751v1, Apr. 22, 2019.

Ippolito, Daphne; Duckworth, Daniel; Callison-Burch, Chris; and Eck, Douglas. "Automatic Detection of Generated Text Is Easiest When Humans Are Fooled". In Proceedings of the 58th Annual Meeting of the Association for Computational Linguistics, 1808-22, 2020.

Jawahar, Ganesh; Abdul-Mageed, Muhammad; and Lakshmanan, Laks, V.S. "Automatic Detection of Machine Generated Text: A Critical Survey". In Proceedings of the 28th International Conference on Computational Linguistics, pp. 2296-2309, Barcelona, Spain, 2020.

Khalifa, Muhammad; Elsahar, Hady; and Dymetman, Marc. "A Distributional Approach to Controlled Text Generation". Published on arXiv.org as 2012.11635v2, May 6, 2021.

Leroux, Hugo. "l'intelligence articielle a-t-elle joué un rôle dans l'élection américaine?". Published on the Internet at science-et-vie. com, 2020.

Manber, Udi; and Myers, Gene. "Suffix Arrays: A New Method for On-Line String Searches". SIAM Journal on Computing vol. 22, No. 5, pp. 935-948, Oct. 1993.

Maronikolakis, Antonis; Schutze, Hinrich; and Stevenson, Mark. "Identifying Automatically Generated Headlines Using Transformers". Published on arXiv.org as 2009.13375v3, Apr. 25, 2021.

Massarelli, Luca; Petroni, Fabio; Piktus, Aleksandra; Ott, Myle; Rocktäschel, Tim; Plachouras, Vassilis; Silvestri, Fabrizio; and Riedel, Sebastian. "How Decoding Strategies Affect the Verifiability of Generated Text". In Findings of the Association for Computational Linguistics: EMNLP 2020, pp. 223-235, 2020.

Mikolov, Tomas; Chen, Kai; Corrado, Greg; and Dean, Jeffrey. "Efficient Estimation of Word Representations in Vector Space". Published on arXiv.org as 1301.3781v3, Sep. 7, 2013.

Platen, Patrick Von. "How to Generate Text: Using Different Decoding Methods for Language Generation with Transformers". Published on the Internet at huggingface.co/blog/how-to-generate, Mar. 18, 2020.

Radford, Alec; Wu, Jeffrey; Child, Rewon; Luan, David; Amodei, Dario; and Sutskever, Ilya. "Language Models Are Unsupervised Multitask Learners". Published on the internet at cdn.openai.com/betterlanguagemodels/language_models_are_unsupervised_multitask_learnes.pdf, OpenAI blog, 2019.

(56) References Cited

OTHER PUBLICATIONS

Raffel, Colin; Shazeer, Noam; Roberts, Adam; Lee, Katherine; Narang, Sharan; Matena, Michael; Zhou, Yanqi; Li, Wei; and Liu, Peter J. "Exploring the Limits of Transfer Learning with a Unified Text-to-Text Transformer". In Journal of Machine Learning Research, 21(140):1-67, 2020.

Reiter, Ehud; and Dale, Robert. "Building Natural Language Generation Systems". In Studies in Natural Language Processing. Cambridge University Press, 2000.

Solaiman, Irene; Brundage, Miles; Clark, Jack; Askell, Amanda; Herbert-Voss, Ariel; Wu, Jeff; Radford, Alec; et al. "Release Strategies and the Social Impacts of Language Models". Published on arXiv.org as 1908.09203v2, Nov. 13, 2019.

Uchendu, Adaku; Ma, Zeyu; Le, Thai; Zhang, Rui; and Lee, Dongwon. "TURINGBENCH: A Benchmark Environment for Turing Test in the Age of Neural Text Generation". Published on arXiv.org as 109.13296v1, Sep. 27, 2021.

Vaswani, Ashish; Shazeer, Noam; Parmar, Niki; Uszkoreit, Jakob; Jones, Llion; Gomez, Aidan N; Kaiser, Lukasz; and Polosukhin, Illia. "Attention Is All You Need". Published on arXiv.org as 1706.03762v5, Dec. 6, 2017.

Welleck, Sean; Kulikov, Ilia; Roller, Stephen; and Dinan, Emily. "Neural Text Degeneration With Unlikelihood Training". In International Conference on Learning Representations, 2020.

Wolf, Thomas; Debut, Lysandre; Sanh, Victor; Chaumond, Julien; Delangue, Clement; Moi, Anthony; Cistac, Pierric; et al. "Transformers: State-of-the-Art Natural Language Processing". In Proceedings of the 2020 Conference on Empirical Methods in Natural Language Processing: System Demonstrations, pp. 38-45, 2020.

Yang, Ze; Xu, Can; Wu, wie; And Li, Zhoujun. "Read, Attend and Comment: A Deep Architecture for Automatic News Comment Generation". In Proceedings of the 2019 Conference on Empirical Methods in Natural Language Processing and the 9th International Joint Conference on Natural Language Processing (EMNLP-IJCNLP), 5076-88. Hong Kong, China: Association for Computational Linguistics, 2019.

Zellers, Rowan; Holtzman, Ari; Rashkin, Hannah; Bisk, Yonatan; Farhadi, Ali; Roesner, Franziska; and Choi, Yejin. "Defending Against Neural Fake News". In Advances in Neural Information Processing Systems, 2019.

\* cited by examiner

Ex. 1: I could hardly tell what
Ex. 2: In the latter part of the
Ex. 3: an important figure in the
Ex. 4: that it is impossible for
Ex. 5: they had nothing to do with
Ex. 6: for long periods of time

FIG. 3

"Oh, you're a dry journalist," Miss Shelton remarked. "You wouldn't understand, are you?" "No, I won't understand," Albert responded. "Ah," Miss Shelton said. "I don't think so." "I'm quite right. We've worked up a bit of hostility, the past couple of months, so you wouldn't be able to understa

---

Our attention, therefore, may, with some propriety, be drawn to the inconveniences which are caused by the coming into contact of many members of a particular family, in consequence of intermarriage, according to one particular, and the infusion into it of a fatal mixture; which, in a time of incre

---

In this sense there are few facts more striking than that human race has been spread over a number of different regions of the globe from two widely separated periods of natural history, of which both appear to have been limited by natural resources. From what is now South America to Africa is not

---

They went out, turned down the staircase, and into the gardens, and drew up the stones, prepared a rug. Rostóv put on his usual shirt, pocket-handkerchief, hat, coat, shoes, and went to bed. II It was only late in the night, and the moon was quite high, that Rostov's uncle sent for him. When he r

---

And his plan was laid before me: it was that when I rose the dance-shoppe would be empty of men; the new moon would no longer be a sign of opportunity to exercise its power of purifying it; and I should break the hearts of the children of thy sister. My hands trembled before the dread of a word whi

FIG. 9

At length the breathless hunter came so nigh his seemingly unsuspecting prey, that his entire dazzling hump was distinctly visible, sliding along the sea as if an isolated thing, and continually set in a revolving ring of finest, fleecy, greenish foam. He saw the vast, involved wrinkles of the slig Night was coming on, so I left the river, and went into a thicket, where I covered myself all over with leaves, and presently heaven sent me off into a very deep sleep. Sick and sorry as I was I slept among the leaves all night, and through the next day till afternoon, when I woke as the sun was we

FIG. 10

COMPUTER-IMPLEMENTED METHOD FOR DISTRIBUTIONAL DETECTION OF MACHINE-GENERATED TEXT

PRIORITY INFORMATION

The present application claims priority, under 35 USC § 119 (e), from U.S. Provisional Patent Application, Ser. No. 63/254,063, filed on Oct. 9, 2021. The entire content of U.S. Provisional Patent Application, Ser. No. 63/254,063, filed on Oct. 9, 2021, is hereby incorporated by reference.

FIELD

The present disclosure relates to a computer-implemented method for distributional detection of machine-generated documents within a collection of documents including both machine-generated and human-authored documents. One of the embodiments includes detecting a natural language processing feature, such as long-repeated substrings, in the collection of documents, developing a pseudo-annotated dataset based on such detection, and training an ensemble of classifiers with the pseudo-annotated dataset.

BACKGROUND

The capacity of large pretrained transformer-based language models (i.e., "generators"), such as OpenAI's well known family of GPT models, is increasing interest in open-ended language generation. The capacity of such generators to create human-like text (as demonstrated by, for instance "A Robot Wrote this Entire Article. Are you Scared Yet" available at theguardian.com/commentisfree/2020/sep/08/robot-wrote-this-article-gpt-3) is impressive. However, such models pose the threat of generating a document that not only appears to be generated by a human but is "fake." This sort of fake document could assume many forms, including, for instance, a news article or comments, without revealing its non-human source. This has led to the creation of a large line of work devoted to addressing the problem of discriminating machine-generated documents from human-authored documents.

One approach for training modern language models includes maximum likelihood estimation. Pursuant to such training, text (i.e., new word (or token) sequences) is inferred in an auto-regressive manner on the basis that the probability distribution of a word sequence can be decomposed into the product of conditional next word distributions (see for example, Platen, P. V., "How to Generate Text: Using Different Decoding Methods for Language Generation with Transformers", available at huggingface.co/blog/how-to-generate). The generation of text may be facilitated by using one of several decoding strategies:

In Greedy decoding the most probable token is selected; however, this approach may not provide an optimal response in open-ended generation.

A probability distribution may be used for selecting a next word. While this approach tends to mimic the unigram distribution of tokens very accurately, it often generates incoherent text and therefore makes it easy for humans to detect.

The top-k sampling approach (see for example Angela Fan, Mike Lewis, and Yann Dauphin, "Hierarchical neural story generation", in arXiv preprint arXiv: 1805.04833, 2018) reduces the universe of possible tokens that can be selected by sampling from the k most probable words. That is, only k probable words are considered for text generation.

The nucleus sampling approach (see for example Ari Holtzman, Jan Buys, Li Du, Maxwell Forbes, and Yejin Choi, "The curious case of neural text degeneration", arXiv preprint arXiv: 1904.09751, 2019), which also reduces the universe of possible tokens that can be selected, samples tokens making up the top p probability mass.

Several recent publications investigate the problem of discriminating machine-generated text from human-authored text. In one investigative example, Daphne Ippolito, Daniel Duckworth, Chris Callison-Burch, and Douglas Eck, "Automatic detection of generated text is easiest when humans are fooled", in Proceedings of the 58th Annual Meeting of the Association for Computational Linguistics, pages 1808-1822, 2020 ("Ippolito et al") disclose an automatic classifier for detecting statistical patterns of a generated document and, depending on the decoding strategy employed, obtains an accuracy for short documents (60 tokens) of 70-90%. The performance of the detector of Ippolito et al differs from that of humans in that humans have a harder time than the detector in picking up statistical signals from a given document but outperform the detector in recognizing incoherent or factually incorrect statements.

In another investigative example, Antonis Maronikolakis, Hinrich Schutze, and Mark Stevenson, "Transformers are better than humans at identifying generated text", arXiv preprint arXiv: 2009.13375, 2020, concluded that automatic models are superior to humans in detecting fake headlines. In yet another investigative example, Liam Dugan, Daphne Ippolito, Arun Kirubarajan, and Chris Callison-Burch, "Roft: A tool for evaluating human detection of machine-generated text", arXiv preprint arXiv: 2010.03070, 2020, focuse specifically on the problem of detecting the boundary between a human-provided prompt and machine generated text.

The above-mentioned investigative examples, as well as several other publications relating the detection of machine-generated text, employ two important assumptions: (1) each detector is operated in a supervised manner, having access at training time to machine-generated samples from the same generator; and (2) a decision is made for each sample individually and independently. Based on the following, it is believed that these two assumptions raise at least two significant concerns: First, any ill-intended adversary could either retrain its own model, or modify generation in such a way as to drift significantly the distribution of generated text. This can easily be done by using either different sampling strategies (or changing the hyperparameters of the same sampling strategy), an a-posteriori re-weighting strategy or one of several controlled generation methods currently available. Second, the problem of determining the origin of one fixed document is, for all intents and purposes, not the real problem. For instance, text generated by an existing template-based data-to-text method (see Ehud Reiter and Robert Dale, "Building natural language generation systems", Cambridge University Press, 2000) is arguably of less concern than an article diffusing false information written by a human author. Indeed, one danger of conventional language models lies in their capacity of generating a large amount of human-like text but biased towards a desired opinion or topic.

It would be desirable therefore to provide a computer-implemented method for detecting machine-generated text that overcomes, or at least alleviates the above-mentioned concerns.

SUMMARY

In a first embodiment there is disclosed a computer-implemented method for detecting machine-generated documents in a collection of documents including machine-generated and human-authored documents as well as repeated substrings. The method includes computing a set of repeated substrings with each repeated substring having at least a selected length for the collection of documents; using a subset of the set of repeated substrings to designate documents containing the subset of the repeated substrings as machine-generated documents, the documents designated as machine-generated comprising positive examples of machine-generated documents; developing negative examples of machine-generated documents, the negative examples of machine-generated documents including at least one human-authored document; creating a dataset including the positive and negative examples of machine-generated documents; training a plurality of automatic binary classifiers by feeding the dataset as input to the plurality of automatic binary classifiers, the plurality of automatic binary classifiers outputting predictions responsive to said feeding; and the outputted predictions varying as a function of an extent to which the documents of the dataset contain machine-generated text.

In one example of the first embodiment, the repeated substrings include super-maximal repeats with each super-maximal repeat including a repeated substring that does not occur in any other repeated substring within the collection of documents. In another example of the first embodiment, each repeated substring in the subset of repeated substrings includes a length of characters and the length of each repeated substring in the subset of repeated substrings is at least 20 characters. In yet another example of the first embodiment, the repeated substrings of the subset of repeated substrings occur at least three times over the collection of documents. In yet another example of the first embodiment the negative examples of machine-generated documents are selected from the full collection of documents. In yet another example of the first embodiment, training is performed in a partially or fully unsupervised setting.

In yet another example of the first embodiment, the negative examples of machine-generated documents are selected from a set of human-authored documents with the set of human-authored documents being separate from the collection of documents. In yet another example of the first embodiment, the dataset includes a first number of documents and a second number of documents with the first number being equal to the second number. In yet another example of the first embodiment, the set of super-maximal repeats are computed with a suffix tree.

In yet another example of the first embodiment, the method includes using the outputted predictions to detect machine-generated documents as well as summing the predictions for each document in the dataset to obtain an amplified signal for each document fed to the plurality of automatic binary classifiers. In yet another example of the first embodiment, the plurality of automatic binary classifiers output a set of votes responsive to each document fed to the automatic binary classifiers, and the set of votes for each document in the dataset is used to obtain the amplified prediction for each document fed to the plurality of automatic binary classifiers. In yet another example of the first embodiment, the method further includes summing the predictions for each document fed to the plurality of automatic binary classifiers to obtain a set of scores; and using the set of scores to rank the documents of the dataset wherein documents that are not detected as machine-generated possess lower scores than documents that are detected as machine-generated. In another example of the first embodiment, the method further includes using the set of scores to develop a second dataset including both second positive examples of machine-generated documents and second negative examples of machine-generated documents; and retraining the plurality of automatic binary classifiers by feeding the second dataset as input to the plurality of automatic binary classifiers, the plurality of automatic binary classifiers outputting predictions responsive to said feeding of the second dataset.

In a second embodiment there is disclosed a computer-implemented method for improving the precision of a plurality of classifiers. The method includes: identifying a natural language processing feature; obtaining a collection of documents including at least one document having the identified natural language processing feature and at least one document that does not have the natural language processing feature; generating a first set of training data from the collection of documents, the first set of training data including the at least one document having the identified natural language feature; developing a first set of training data from the collection of documents, the first set of training data including the at least one document having the identified natural language feature; developing a second set of training data, the second set of training data including the at least one document that does not have the identified natural language processing feature; training the plurality of classifiers with a dataset comprising the respective training data of the first and second sets of training data; said training including (a) feeding each one of the documents of the dataset to the plurality of classifiers and (b) using the plurality of classifiers to output classified data corresponding with the documents of the dataset; and, for each document, combining corresponding classified data for amplifying the natural language processing feature contained within the document.

In one example of the second embodiment, a long-repeated substring of a selected length is identified as the natural language processing feature. In another example of the second embodiment, the long-repeated substring includes a super-maximal substring having the selected length. In yet another example of the second embodiment, the method further includes computing a set of super-maximal repeats with respect to the collection of documents, the collection of documents including machine-generated and human-authored documents. In yet another example of the second embodiment, the method further includes using the computed set of super-maximal repeats to designate which of the machine-generated and human-authored documents are machine-generated documents.

In yet another example of the second embodiment, the second set of training data is developed by selecting the at least one document from the collection of documents. In yet another example of the second embodiment, the second set of training data is developed by selecting the at least one document from a set of human-authored documents in which the set of human-authored documents is separate from the collection of documents. In yet another example of the second embodiment, the number of documents in the first set of training data is equal to the number of documents in the second set of training data.

In yet another example of the second embodiment, a score is assigned to each document and each score varies as a function of an extent to which a corresponding document includes the identified natural language processing feature. In yet another example of the second embodiment, the method further includes using the scores to rank the documents of the dataset wherein documents that are not detected as including the identified natural language processing feature possess lower scores than documents that are detected as including the identified natural language processing feature. In another example of the second embodiment, the method further includes: using the set of scores to develop a second dataset including both a third set of training data including one or more of the at least one document having the identified natural language feature and a fourth set of training data including one or more of the at least one document that does not have the identified natural language processing feature; and retraining the plurality of classifiers by feeding the second dataset as input to the plurality of classifiers, the plurality of classifiers outputting predictions responsive to said feeding of the second dataset.

BRIEF DESCRIPTION OF THE DRAWINGS

The present disclosure will become more fully understood from the detailed description and the accompanying drawings, wherein:

FIG. 3 illustrates examples (designated as Ex. 1 to Ex. 6) of super-maximal repeats (character length ≥20) occurring in the set of documents of FIG. 2;

FIGS. 9 and 10 illustrate, respectively, correct and incorrect examples of the top 25 documents obtained through nucleus sampling on GPT2-Large, using noisy labels for human-authored text (the case of FIGS. 8A-8D).

In the drawings, reference numbers may be reused to identify similar and/or identical elements.

DESCRIPTION

Platform for System Implementation

Figure 1:
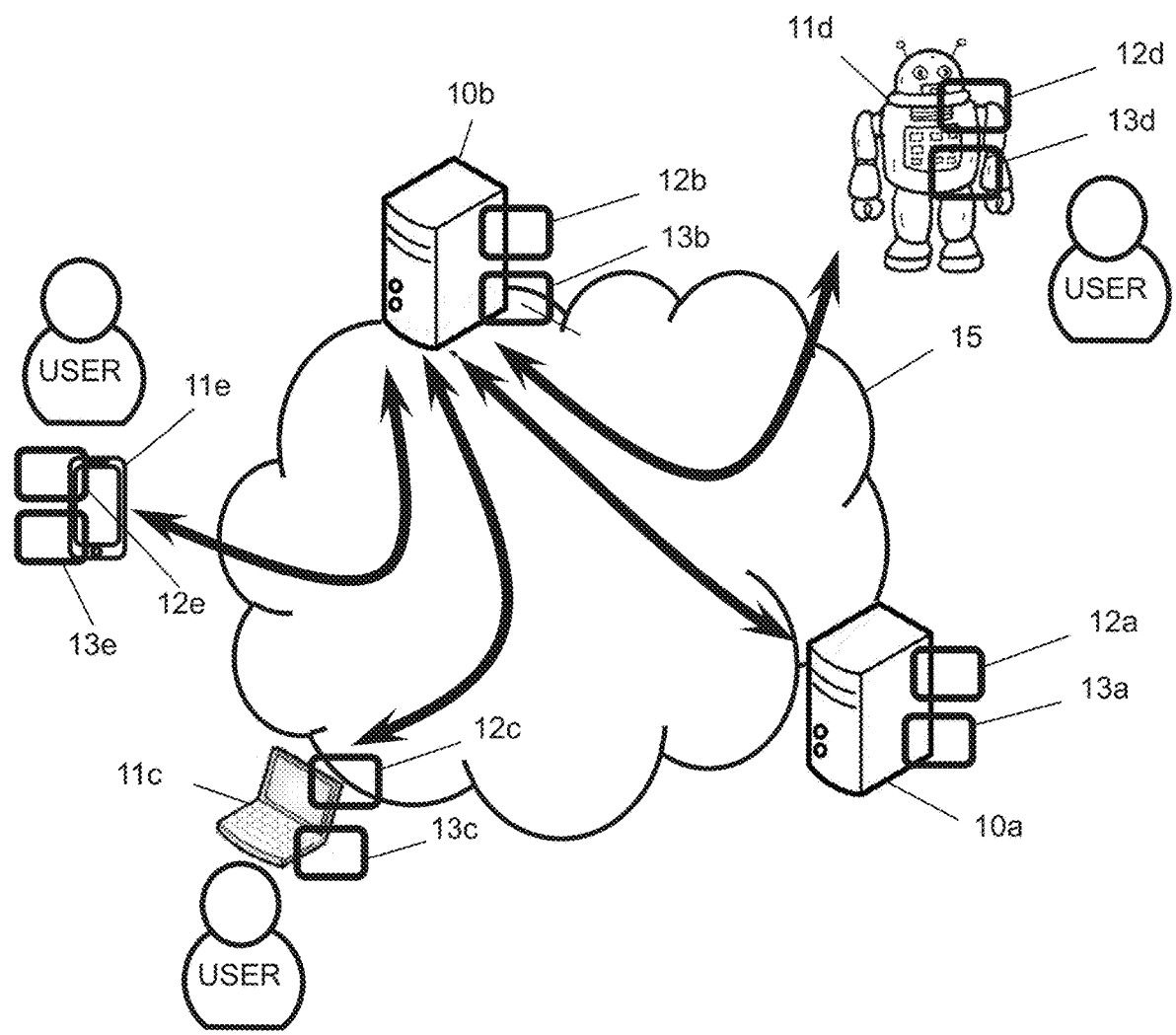
FIG. 1 illustrates a schematic diagram of a hardware platform for implementing a method permitting distributional detection of machine-generated text.

Referring to FIG. 1, an example hardware platform for implementing a method of detecting machine-generated documents in a collection of documents (including both machine-generated and human-authored documents) is illustrated. The platform includes a first server $10a$ and a second server $10b$. In one of the embodiments, the first server $10a$ is a dataset server for storing a training dataset (stored in memory $13a$) and the second server $10b$ is a training server for implementing a method for training a model (stored in memory $13b$), the training dataset including labels pointing to categories. In other embodiments, servers $10a$ and $10b$ may be merged or have reversed functionality.

The servers $10a$ and $10b$ are typically remote computer equipment connected to an extended network 15 such as the Internet for data exchange. The platform of FIG. 1 advantageously comprises one or more items of client equipment 11, which may be any workstation $11c$, robot $11d$, or mobile device $11e$ (which are also connected to network 15), preferably separate from the servers $10a$, $10b$, but possibly being merged with one and/or the other thereof. Each server $10a$, $10b$ and client equipment $11c$, $11d$, $11e$ comprises, respectively, processors $12a$, $12b$, $12c$, $12d$, $12e$, and optionally computer memories $13a$, $13b$, $13c$, $13d$, $13e$. The operators (i.e., "users") of client equipment 11 are typically "clients" in the commercial meaning of the term, of the service provider operating the first and/or second servers $10a$, $10b$.

System Methodology:

The following describes at least one of the embodiments for using a natural language processing feature, namely long-repeated substrings (such as super-maximal repeats) to both detect the extent to which a collection of documents may include machine-generated documents and improve related classifier precision. As follows from the description below, at least one of the embodiments employs pseudo code that, when implemented with a computer, improves the ability of the computer to detect machine-generated documents in a collection of both machine-generated and human-authored documents. It will appear from the description below, however, that underlying principles of the pseudo code can be used, with respect to other embodiments, for improving training of classifiers by, among other things, amplifying training data associated with natural language processing features other than long-repeated substrings.

Regarding the detection of machine-generated text, discriminating between machine-generated text and human-authored text in documents generated by several types of current language models can be very difficult. More particularly, it is known that several types of current language models trained on large-scale data allow for text generation whose individual token probability mimics very closely that of human-authored text. For example, a frequency-rank plot of text obtained through ancestral or nucleus sampling is almost indistinguishable from that of human text (per the famous "Zipf Law").

Figure 2:
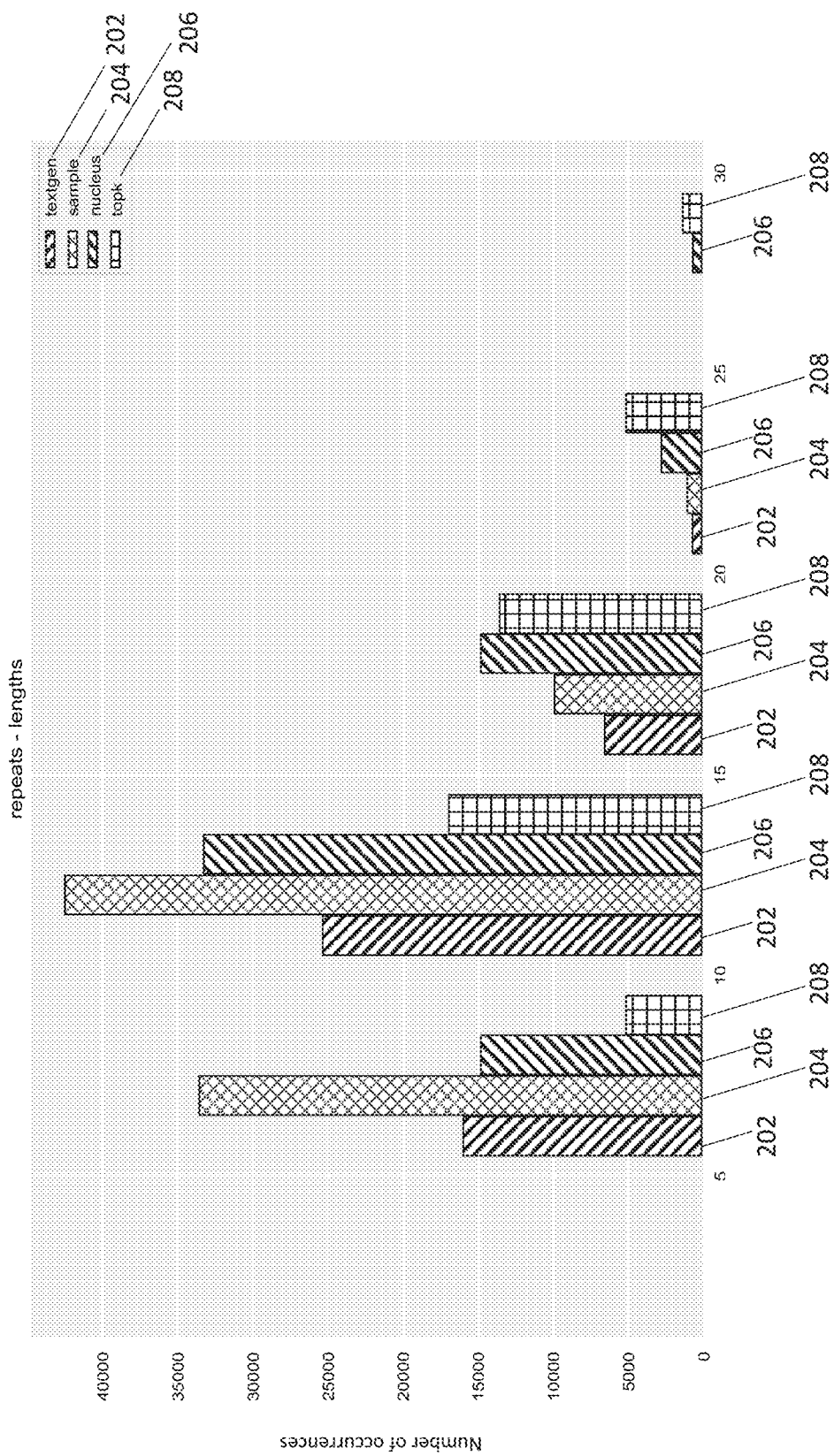
FIG. 2 is a histogram illustrating both the lengths (expressed in terms of characters) and the number (or occurrences) of super-maximal repeats for a set of documents generated with several sampling strategies.

Further analysis, however, does not reveal the same level of difficulty in discrimination when dealing with several other types of language models, such as n-grams. Referring to FIG. 2, a histogram illustrating both the lengths (expressed in terms of characters) and the number of occurrences of super-maximal repeats for a set of documents generated with several sampling strategies is shown. As is known, a repeated substring r is super-maximal with respect to a collection of documents if r does not occur in any other repeated substring.

Referring still to FIG. 2, equivalent sets of documents, where each set is generated using either one decoding strategy on top of a large transformer-based language model GPT-2 (Generative Pre-trained Transformer 2) or sampled human text (as described in further detail below), are considered. The repeats are then computed for each set independently. As can be seen from FIG. 2, when the length of the super-maximal repeat is less than 15 characters, text generated with ancestral sampling (referred to in FIG. 2 as "sample" 204) produces a larger number of super-maximal repeats than text generated with either the "nucleus" sampling 206 or "top-k" sampling 208 (together referred to as "nucleus/top-k") sampling strategy.

As can also be seen in FIG. 2, when the length of the super-maximal repeat is greater than 15 characters, the relationship between text generated with ancestral sampling and text generated with nucleus/top-k sampling changes. Indeed, for text including a super-maximal repeat of greater than 20 characters, the length of the super-maximal repeat for text generated with nucleus/top-k sampling is significantly greater than the text generated with ancestral sampling. Based on a consideration of FIG. 2, it follows that, at least with respect to higher n-grams and the like, super-maximal repeats of greater lengths are more likely to occur in machine-generated text than human-authored text. In FIG. 2, "textgen" 202 refers to human-authored text.

Referring to FIG. 3, examples (designated as Ex. 1 to Ex. 6) of super-maximal repeats (i.e., character length ≥20) occurring in the set of documents (of FIG. 2) generated with nucleus sampling are shown. Each one of these repeats occurred at least three times across the set of documents.

Starting with the analysis performed with respect to FIG. 2, a method for detecting machine-generated documents in a collection of documents including both machine-generated and human-authored documents follows. By reference to the pseudo code in Table 1 (where "clf" is an abbreviation of classifier) for detection of machine-generated documents using repeats, one method of the embodiments can be readily understood by those skilled in the art.

As will appear from the pseudo code in Table 1 and the following description, the embodiments address the problem of detecting machine-generated text as follows: given a collection of documents, and a suspicion that several of those documents include machine-generated documents, a distributional approach that is either semi-supervised or unsupervised can be used to detect the presence of one or more of the machine-generated documents in the collection of documents.

TABLE 1

```
function DETECTION(document set D, # of models K)
   repeats ← supermaximal(D, minLen, minOcc)
   for k ∈ [1 . . . K] do
      subset ← random.choice(repeats, 20)
      pos ← {d ∈ D : ∃r ∈ subset : r ∈ d}
      neg ← random.choice(D, |pos|) // also experiment
         using true human text
      clf_k ← train(pos, neg)
   end for
```

$$score_d \leftarrow \sum_{k=1}^{K} clf_k(machine|d) > clf_k(human|d) \forall\ d \in D$$

```
   return sort(score)
end function
```

Figure 4:
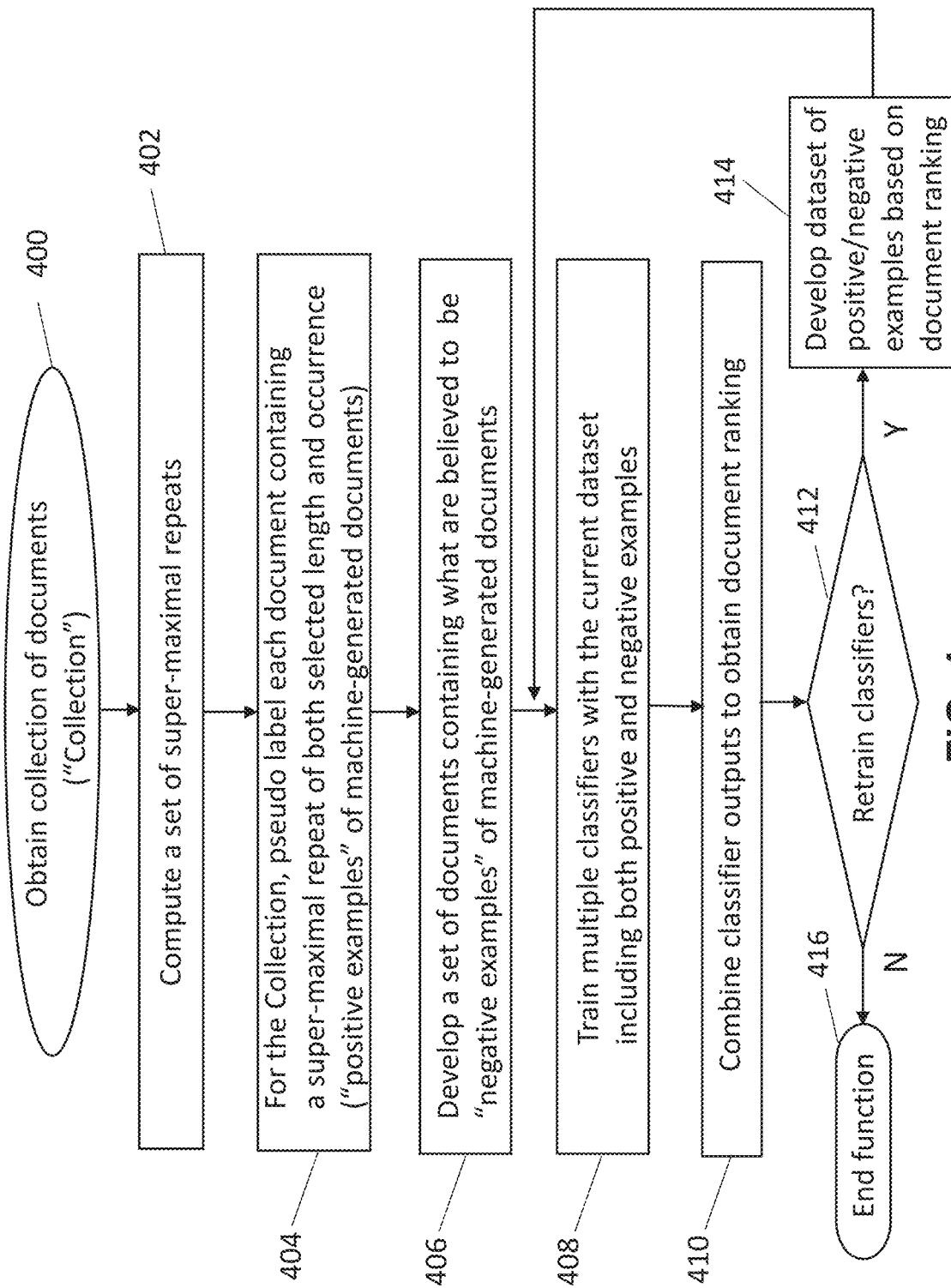
FIG. 4 is a flowchart illustrating pseudo-code usable with a computer for training multiple classifiers in which development of the training data includes detecting super-maximal repeats in a collection of documents (including machine-generated documents and human-authored documents)

Referring now to FIG. 4, the pseudo code in Table 1 is described in further detail. Initially, given a full collection of both machine-generated and human-authored documents ("Collection") at 400, a set of super-maximal repeats is computed at 402. In an example of the embodiments, the Collection is known to include at least some machine-generated documents. The number of super-maximal repeats (and their number of occurrences) is linear in (and even bounded by) the combined length of all documents. In one example, the set of super-maximal repeats can be computed efficiently in linear time with respect to the total length of the collection of documents using a suffix-tree-like data structure, taking advantage of the fact that a repeated substring r is not super-maximal with respect to a collection of documents if r can be extended at either side by some symbol and still be a repeated substring. As will follow from the description of an exemplary implementation below, it is possible to compute the super-maximal repeats using a more memory efficient variation on a suffix array.

At 404 in FIG. 4, each document (in the Collection of documents 400) including at least one super-maximal repeat having a length of at least twenty characters (i.e., "minLen" in Table 1) and occurring at least three times (i.e., "minOcc" in Table 1) over the collection of documents (as shown in the example in FIG. 3), is pseudo labeled as machine-generated text. In alternate embodiments, the values of minLen (i.e., the super-maximal minimum length) and/or minOcc (i.e., the super-maximal minimum occurrence) may be adjusted. Pseudo labeling documents in the Collection satisfying both the super-maximal length and the super-maximal recurrence results in a set of documents including "positive examples" of machine-generated documents.

At 406 in FIG. 4, another set of documents, equal in number of documents to the set of pseudo-labeled machine-generated documents and containing what are believed to be human-authored documents is developed. This results in a set of documents including "negative examples" of machine-generated documents. As contemplated by at least one aspect of the disclosed embodiments, the set of negative examples are obtained by way of at least one of two approaches. In a first approach—referred to as the "noisy" approach—the negative examples are selected from the Collection, for example, by random sampling. While this results in a contemplated error of 50%, use of the first approach, as will appear, advantageously permits unsupervised training of a set of classifiers with a dataset including both the positive and negative examples. In a second approach, the negative examples are selected from a separate collection of human-authored documents. Use of the second approach has the advantage of significantly reducing error in selection of human-authored documents but does not allow for unsupervised training. However, since the positive examples are automatically selected (by way of automatic labeling), the second approach at least affords semi-unsupervised training.

At 408 in FIG. 4, a dataset including the positive and negative examples is fed as input to a set of classifiers for training the same. In one embodiment each classifier is an automatic binary classifier and the set of classifiers is trained with K documents. In one embodiment, each document is fed to the classifiers and a final ensemble model can be obtained by simply summing the predictions of each individual classifier with each document in the dataset being ranked according to the amount of time it was predicted to be machine-generated. Binary classifiers in the set of binary classifiers may include but are not limited to neural networks, decision trees, Bayesian networks, logistic regression, etc.

It has been found that output data corresponding with at least some of the classified documents can be noisy. Accordingly, the classifier outputs from the set of classifiers are combined at 410 in FIG. 4 to yield amplified output data for each document. As follows from the pseudo code in Table 1, a score for each document can be obtained from the classified output of the set of classifiers. Alternatively, the output of the set of classifiers could assume the form of voting in which the votes would be summed to obtain the above-mentioned document ranking. From the rankings, documents in the Collection may be identified as to contain machine-generated text.

As further contemplated by the method of at least one of the embodiments, the results of the training at 408 and document ranking at 410 can be used to retrain the classifiers. That is, if it is decided, at 412, that retraining of the classifiers is desired, another dataset is developed at 414, otherwise the function ends at 416. In one example at 414, the scores of the classified documents are sorted—as shown in the pseudo code in Table 1—and thresholds are set. In this one example, scores vary according to the extent to which corresponding documents are perceived to contain machine-generated text. Accordingly, classified documents having scores at or above a higher threshold ($\geq 80\%$) are selected for the new dataset at 414 as being positive examples of machine-generated documents. Also, classified documents having scores at or below a lower threshold ($\leq 20\%$) are selected for the new dataset at 414 as being negative examples of machine-generated documents. In turn the new dataset is fed to the classifiers, via 408, for retraining.

Figure 5:
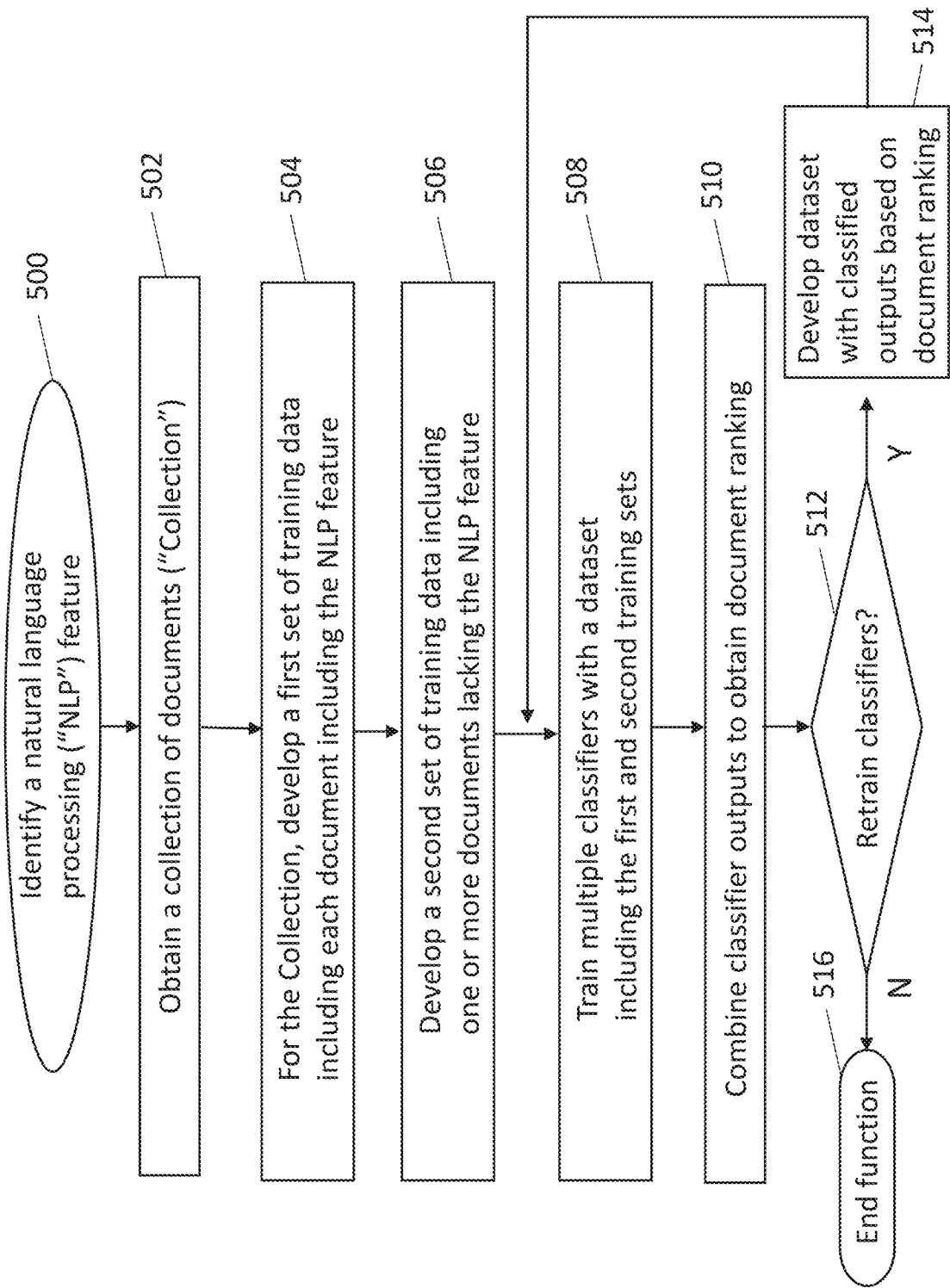
FIG. 5 is a flowchart illustrating pseudo-code usable with a computer for training multiple classifiers in which development of the training data includes detecting a natural language processing feature in a collection of documents.

It will be appreciated by those skilled in the art that the pseudo code in Table 1 can be used with natural language processing ("NLP") features, other than super-maximal repeats, to optimize classifier (and thus computer) functionality. Referring to FIG. 5, another embodiment for using the disclosed pseudo code in Table 1 is described. Initially, at 500, an NLP feature is either identified or selected. The NLP feature may be selected from one of several known linguistic-variable classes used in such areas as determining authorship of documents. Linguistic-variable classes may include lexical, stylometric, graphemic and syntactic classes. Detailed description of these four classes is provided in U.S. Pat. No. 9,880,995, the entire disclosure of which is incorporated herein by reference. In one example, the NLP feature could be selected from stylometric variables, such as word length, sentence length, paragraph length, or counts of short words.

At 502 in FIG. 5, a collection of documents, at least some of which include the NLP feature, is obtained. As contemplated, certain criteria would be used to set the NLP feature as certain criteria was used to set the super-maximal repeats (namely length and occurrence). In one example, length, such as word, sentence or paragraph length could be used in setting the NLP feature. With the selected NLP feature, a first set of training data (including each document in which the selected NLP feature exceeds a first threshold) is developed at 504 in FIG. 5 from the collection of documents, and a second set of training data (including one or more documents in which the NLP feature of each document is below a second threshold) is developed at 506 in FIG. 5 from the collection of documents.

At 508 in FIG. 5, a dataset including the first and second sets of training data, is fed as input to a set of classifiers for training the same. In this example, each classifier may be an automatic binary classifier and the set of classifiers trained with K documents. Additionally, copies of each document are fed respectively to the classifiers and a final ensemble model can be obtained by simply summing the predictions of each individual classifier. Pursuant to combining classifier outputs at 510, amplified output data is obtained for each document and the documents can be ranked to indicate an extent to which each document contains the selected NLP feature.

Referring still to FIG. 5, in the event retraining of the classifiers is desired (a yes decision at 512), a new dataset may be developed at 514, otherwise the function ends at 516. As described above, with respect to FIG. 4, thresholds may be applied to the classified output data for obtaining a new dataset including examples of classified output data containing higher amounts of the selected NLP feature and examples of classified output data containing lesser amounts of the selected NLP feature. In turn, the new dataset is fed to the classifiers, at 508, for retraining the classifiers as well as improving the functionality of the classifier ensemble (and thus the computer implementation).

Exemplary Implementation

At least one of the embodiments was implemented by downloading the top 100 books from the Gutenberg Project according to their frequently viewed page (available at gutenberg.org/browse/scores/top) on Jul. 27, 2020. Corresponding content was extracted, texts were split into paragraphs—keeping only the ones with at least 100 characters—and a prompt made of up of the two first sentences of each paragraph was added. Small GPT-2, 117M parameters, through Hugging Face's Transformers library, were then used to generate continuations for the prompts using the following decoding algorithms: ancestral sampling; top-k sampling (k=10); and Nucleus sampling (p=0.8). In selecting a dataset, corresponding generations were filtered so that only generations with at least 300 characters were retained—the prompts were discarded. To control for biases in different lengths, generated text after the 300th character was trimmed.

The resulting generated continuations (34,258 for GPT2-small, a bit less for the other models) were split evenly to obtain a dataset of machine generated and human continuations. For the training of the individual models in one embodiment, negative examples of machine-generated documents were obtained from a separate dataset of known human continuations. As mentioned above, the approach of obtaining negative examples of machine-generated documents from known human continuations allows for a semi-supervised setting, but not a setting for a fully unsupervised setting. An assumption that known human continuations would be available seems reasonable since certified human writers are generally accessible, while machine "writers" are not. Implementation was also performed without the known human continuations, thus incurring an estimated error of 50% when picking up random human-authored documents.

Figure 6:
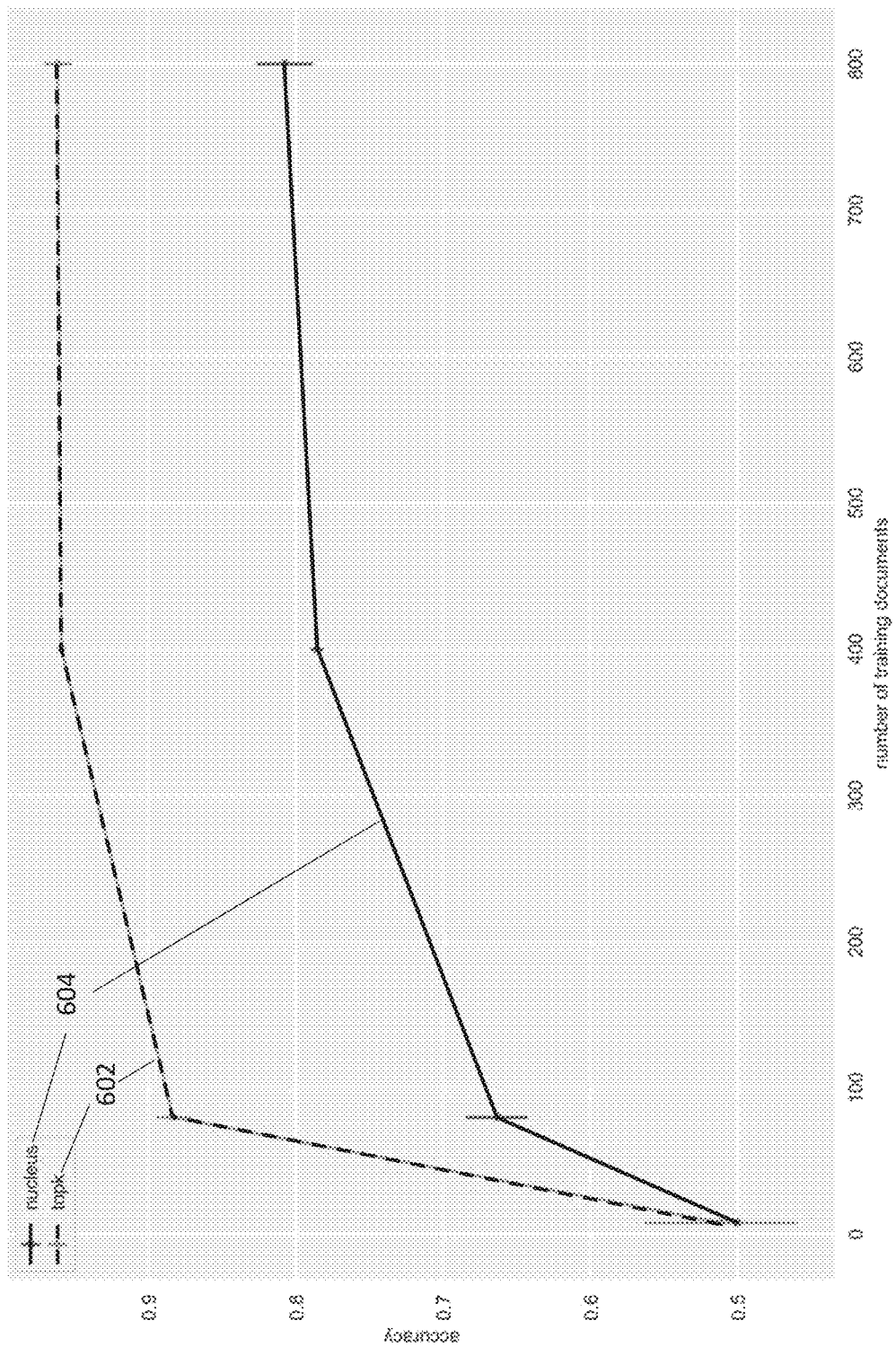
FIG. 6 is a graph illustrating the accuracy of results obtained when using the disclosed distributional detection approach in a fully supervised setting.
Figure 7A:
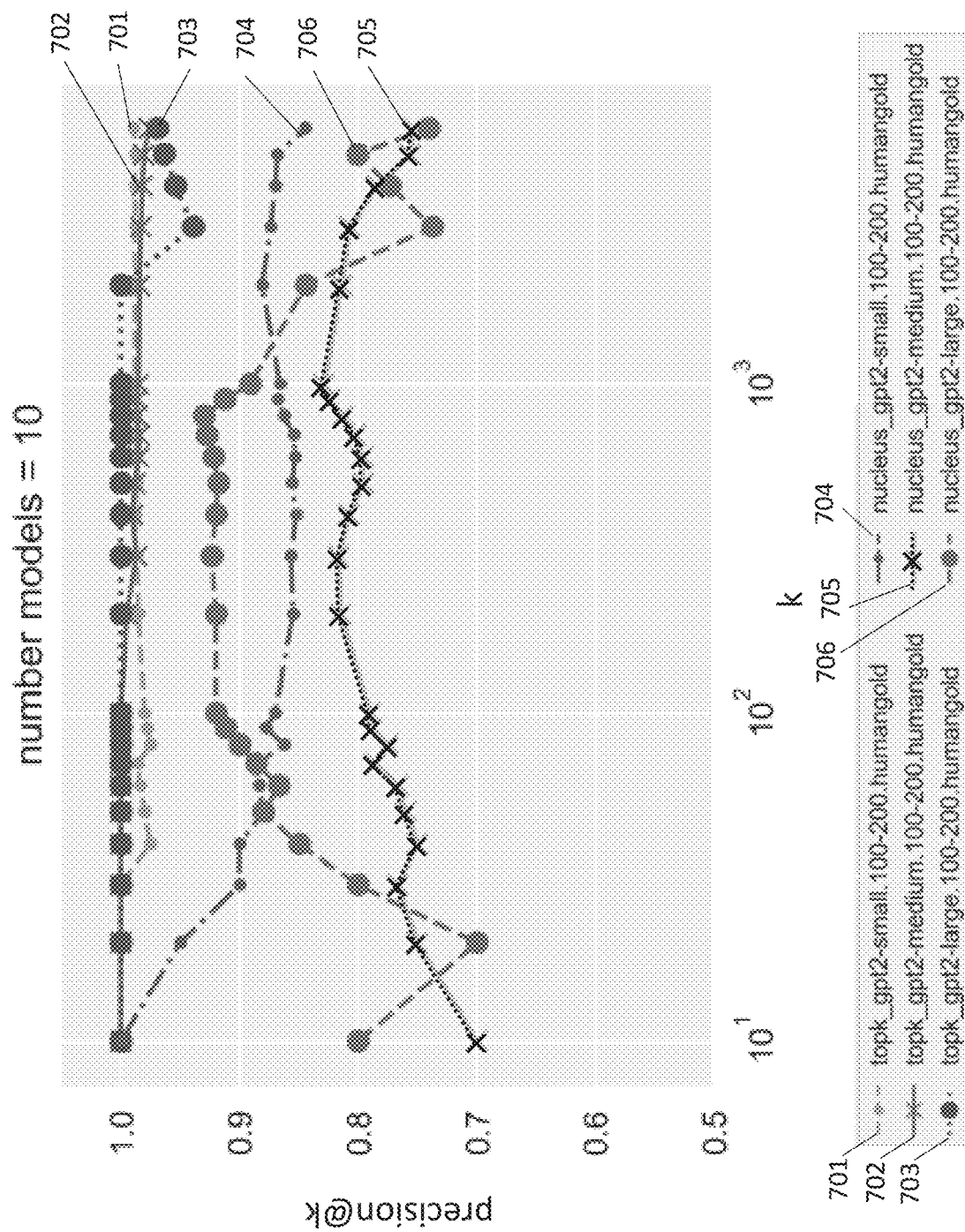
FIG. 7A, FIG. 7B, FIG. 7C, and FIG. 7D include graphs of one embodiment, the graphs of the one embodiment illustrating values for "precision at k" (i.e., the proportion of the first k documents correctly labelled as machine-generated text) obtained with two sampling strategies.
Figure 7B:
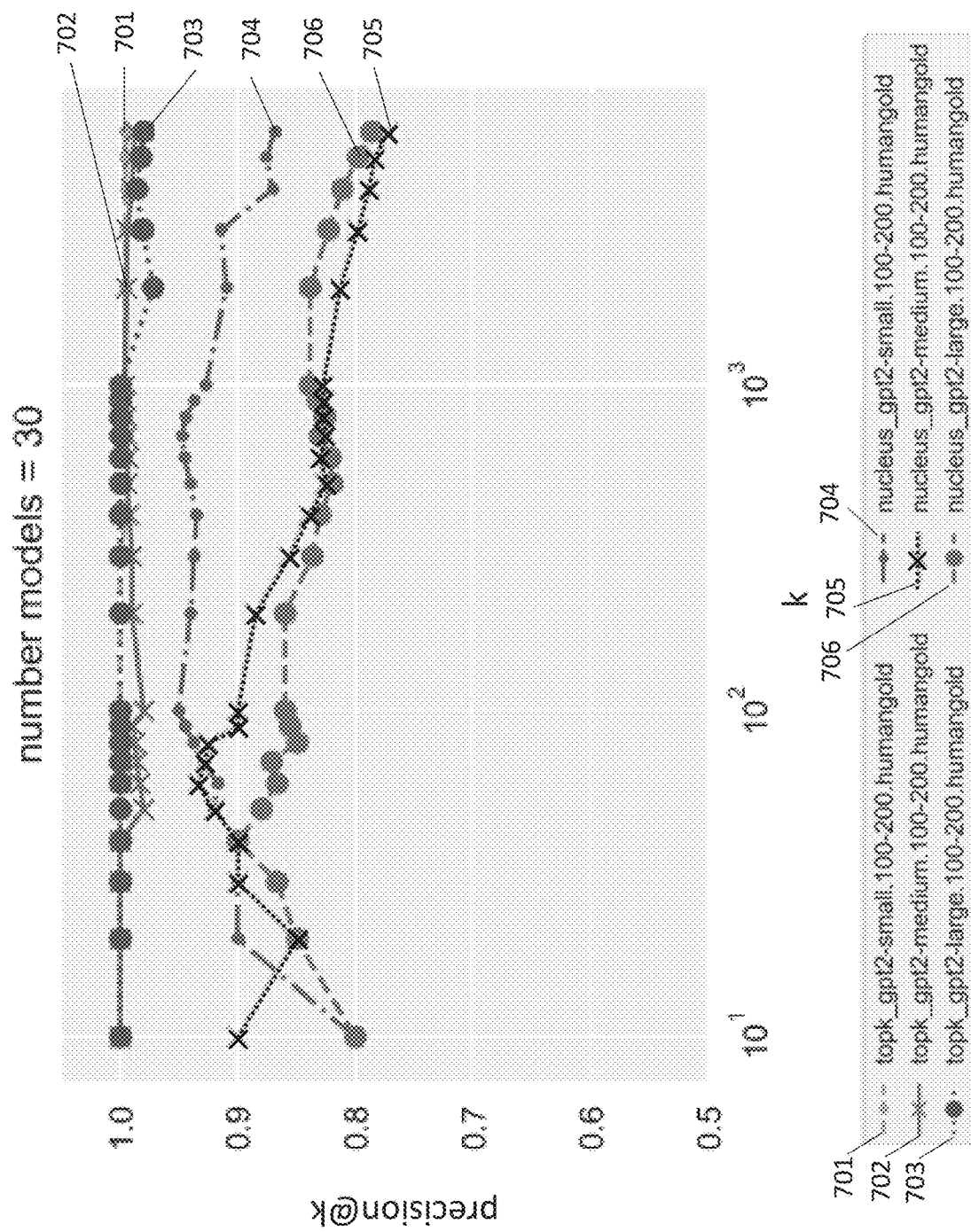
Figure 7C:
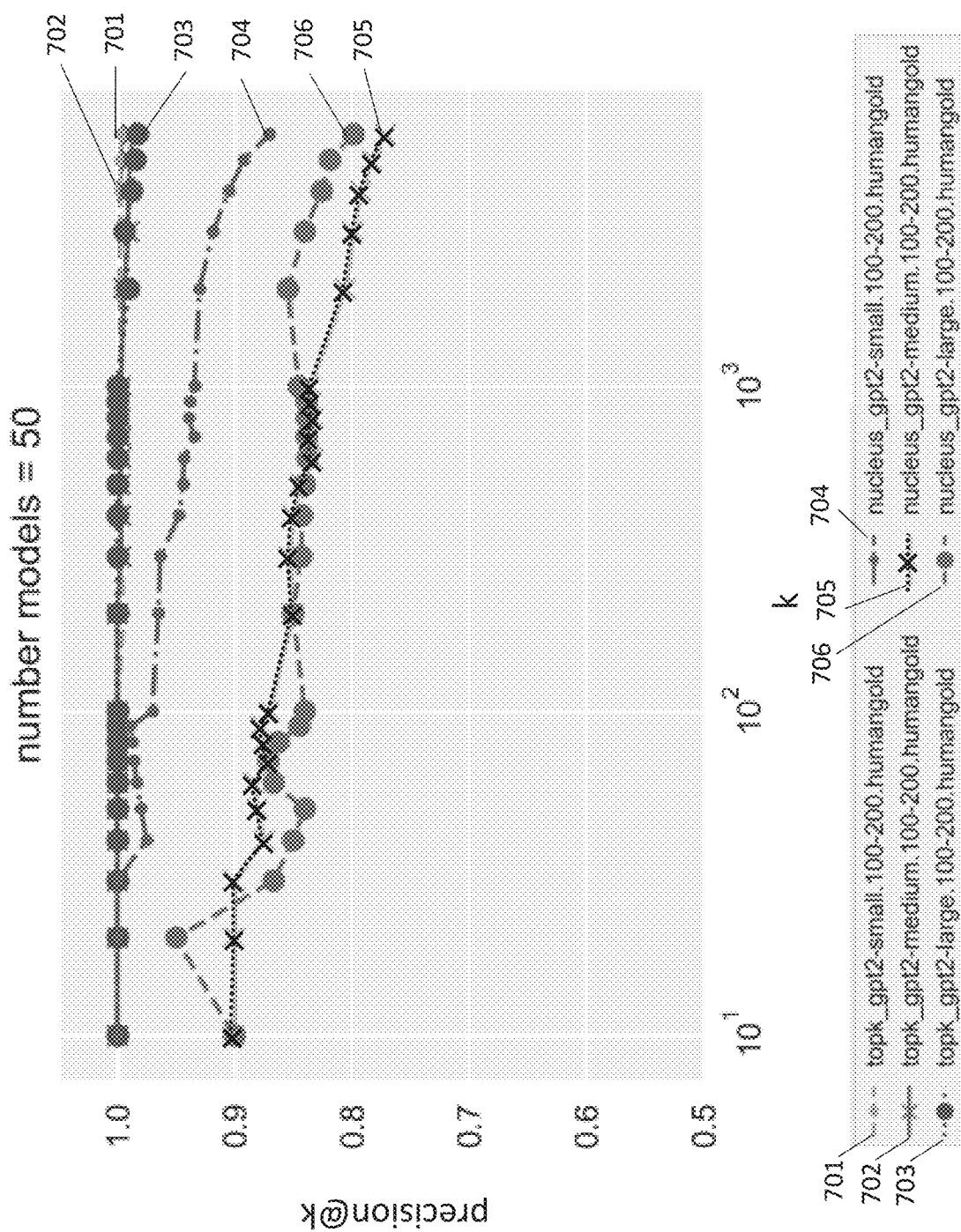
Figure 7D:
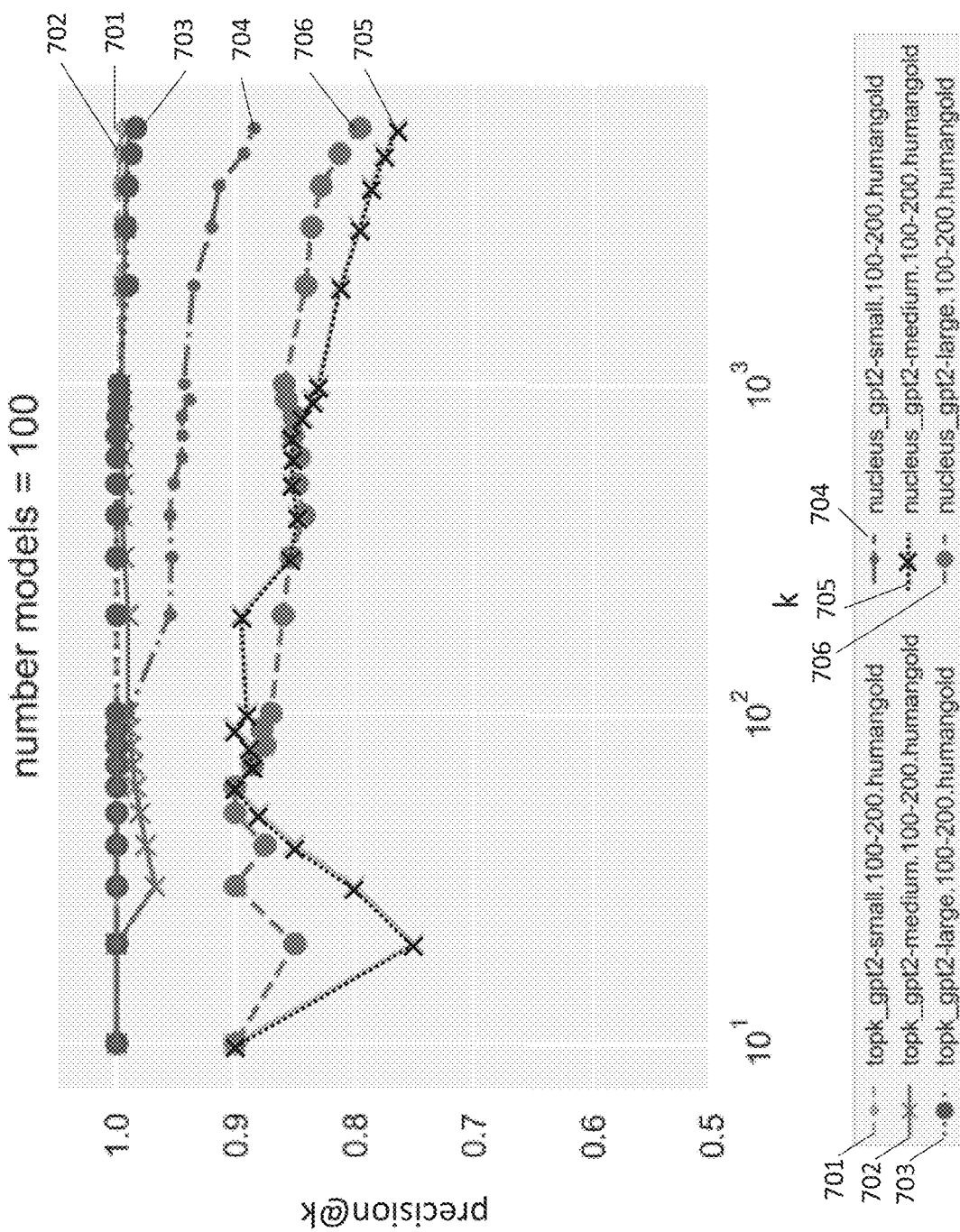
Figure 8A:
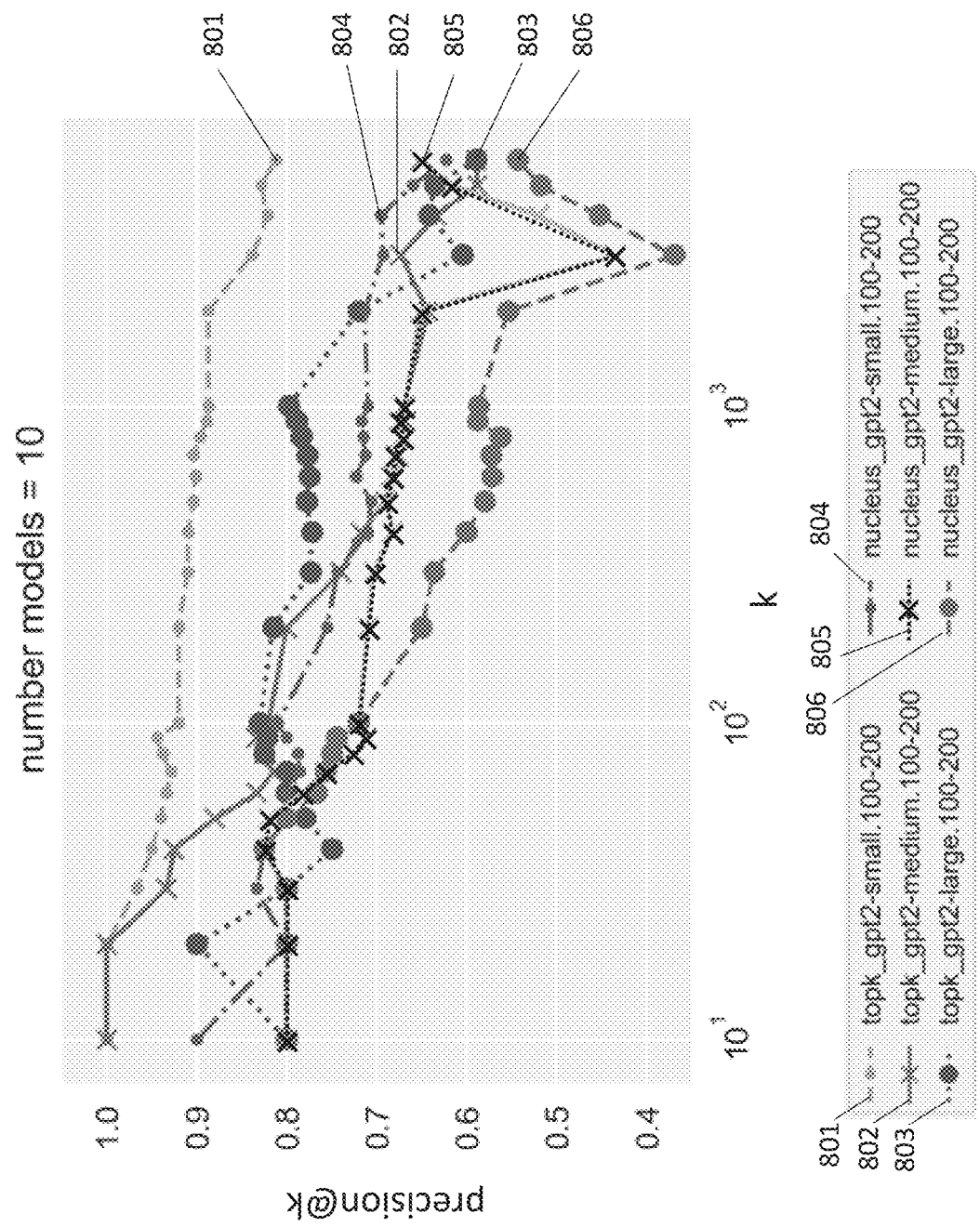
FIG. 8A, FIG. 8B, FIG. 8C, and FIG. 8D include graphs of another embodiment, the graphs of the other embodiment illustrating values for "precision at k" (i.e., the proportion of the first k documents correctly labelled as machine-generated text) obtained with two sampling strategies.
Figure 8B:
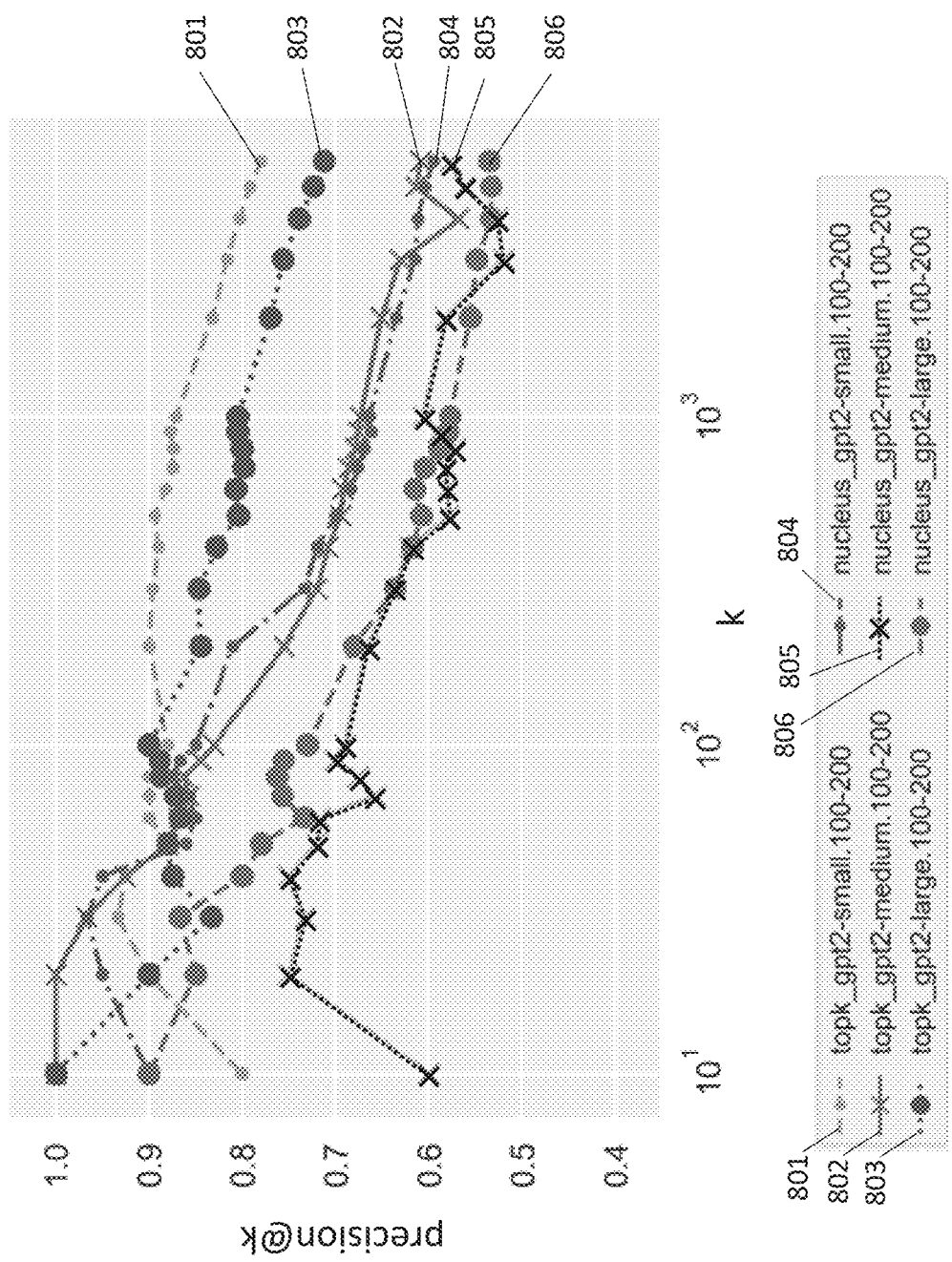
Figure 8C:
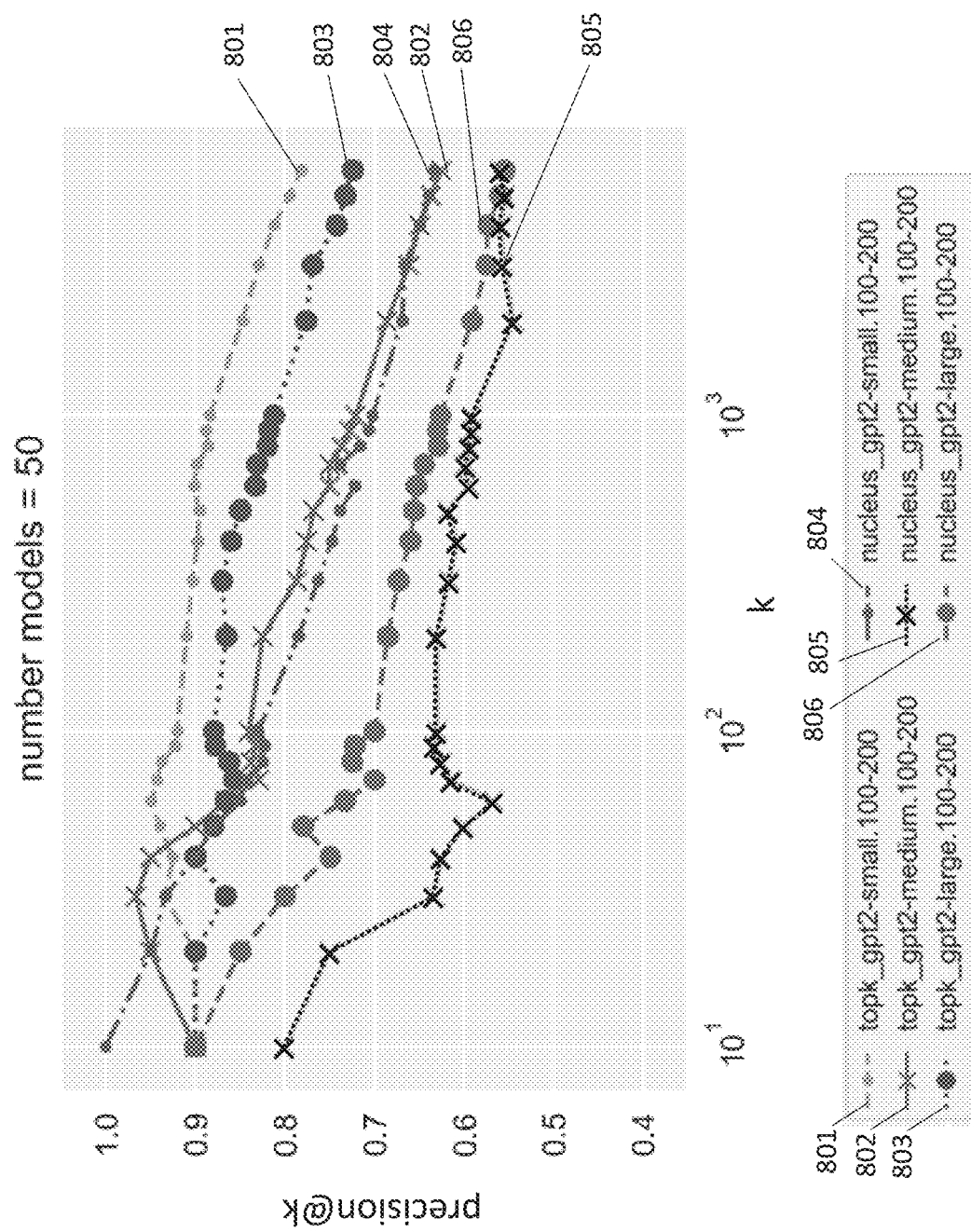
Figure 8D:
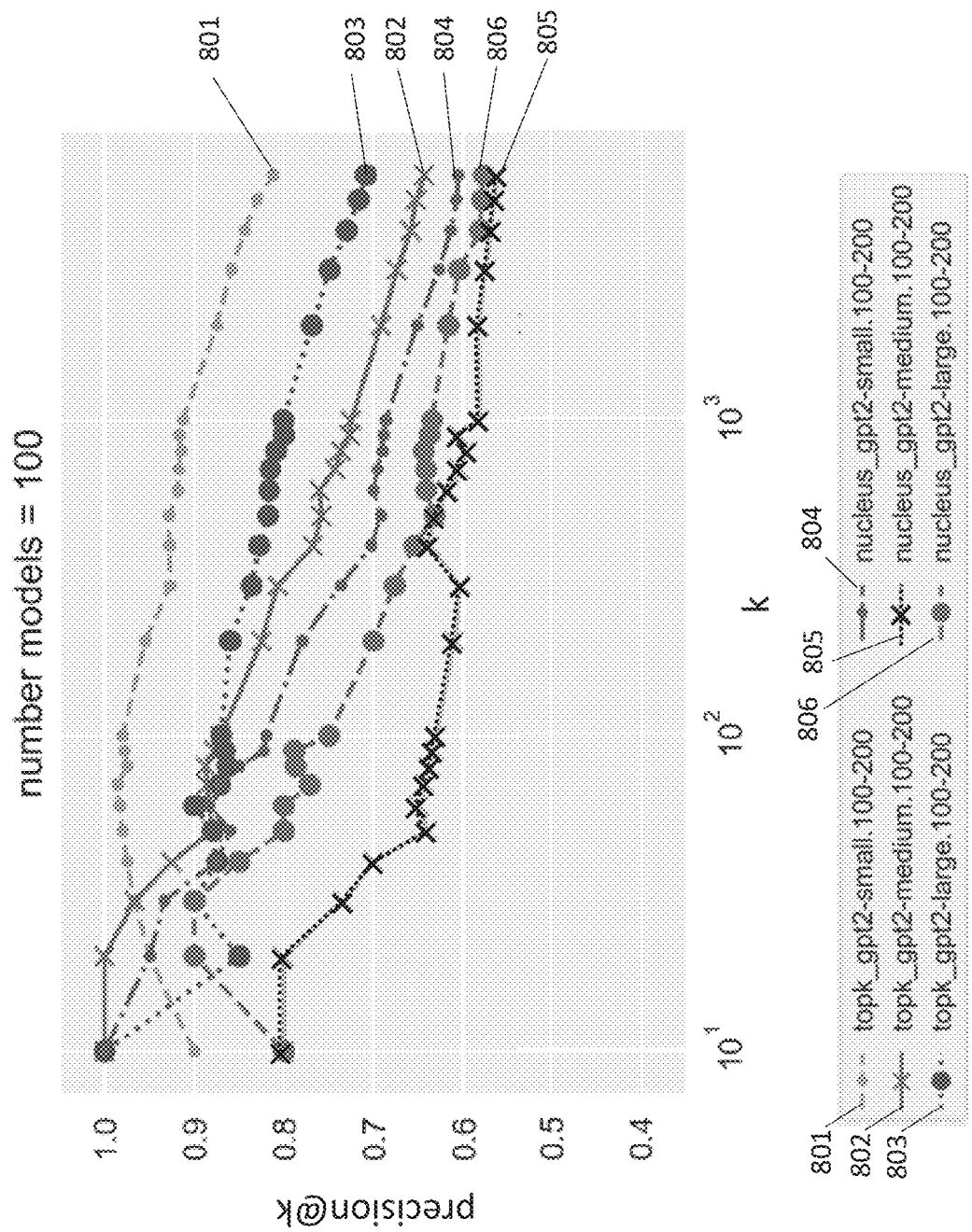

To investigate the subject approach of detecting machine-generated documents in a document collection including both machine-generated and human-authored documents, super-maximal repeats that are longer than twenty characters long and that occur at least three times were obtained from a distilled BERT model (as provided by HuggingFace). These parameters were used to generate results across six settings including three model sizes (corresponding respectively to GTP-2 released model sizes of 124M, 355M and 774M parameters) and two sampling strategies (top-k and nucleus). Referring to FIG. 6, as reference, the accuracy with respect to a dataset both obtained with a supervised approach (using the distilled BERT architecture) and trained with an increasingly larger number of annotated documents is shown for top-k 602 and nucleus 604.

To further assess the embodiments, a scenario is assumed in which the disclosed methodology would be employed in a semi-automatic system where human annotators would receive a collection of documents (including both machine-generated and human-authored documents) for revision of suspicious documents, i.e., where the data corresponding with machine-generated text is noisy. In this sort of scenario, accuracy of the final method is considered less significant than the capacity to propose a set with high precision of machine-generated text. FIG. 7A, FIG. 7B, FIG. 7C and FIG. 7D (together "FIGS. 7A-7D") illustrate values for "precision at k" (i.e., the proportion of the first-k documents correctly labelled as machine-generated text) obtained with two sampling strategies.

The results of FIGS. 7A-7D are sorted according to the sum of individual experts (namely classifiers) or models and are shown for increasing numbers of experts (i.e., 10, 30, 50 and 100, in FIGS. 7A-7D respectively). As can been seen from the results, nucleus sampled text 704-706 is harder to detect than top-k sampled text 701-703. While there is a clear difference in results for these two sampling techniques, the performance of the disclosed machine-generated text detection system does not necessarily vary significantly between smaller and larger language models. For instance, values in FIGS. 7A-7D are reasonably close between GPT2-medium and GPT2-large. It is further noted that in almost all cases of FIGS. 7A-7D, when k=5000 and more than 30 experts are employed, the precision remains generally higher than 80% and is close to 100% for top-k sampling.

FIG. 8A, FIG. 8B, FIG. 8C and FIG. 8D (together "FIGS. 8A-8D") illustrate the same results as FIGS. 7A-7D, except noisy data is used for both the machine-generated and human-authored documents. This corresponds with a scenario in which no other in-domain human-authored text is available. While the results for precision at k of FIGS. 8A-8D are significantly lower than the results for precision at k for FIGS. 7A-7D, the precision at k for FIGS. 8A-8D remain relatively high for top-k sampling 801-803 and is around 80% for nucleus sampling 804-806 on GPT2-large 806 for the first 100 documents.

FIG. 9 and FIG. 10 illustrate, respectively, correct, and incorrect classification examples of the top 25 documents obtained through nucleus sampling on GPT-2 Large, using noisy labels for human-authored text (the case of FIGS. 8A-8D). The text of FIG. 9 was correctly classified as machine-generated while the text of FIG. 10 was incorrectly classified as machine-generated. That is, the exemplary sentences of FIG. 10 were actually human-authored. Based on human judgment alone, there does not appear to be anything about the respective examples of FIG. 9 and FIG. 10 that would permit one to detect whether one or the other is machine-generated or human-authored. However, such detection is possible when the distributional approach of the disclosed embodiments is employed.

Those of ordinary skill in the art will appreciate how the above-described embodiments improve both the detection of machine-generated documents and related computer functionality:

First, the disclosed distributional approach allows for reliable computer detection of machine-generated documents in a collection of documents (including both machine-generated and human-authored documents) for, among other things, identifying false information, such as fake news or comments. In one embodiment, this is achieved by using a computer to both generate a dataset, including positive and negative examples of machine-generated documents, and training an ensemble of classifiers with the dataset.

An efficient approach for designating the positive examples of machine-generated documents includes using the computer, in conjunction with innovative pseudo-code, to detect an extent to which the documents in the collection of documents contain long-repeated substrings, such as super-maximal repeats. It has been found that, in terms of detecting machine-generated documents, considerable reliability can be achieved by using super-maximals to identify which documents, in a large collection of documents (including both machine-generated and human-authored documents), contain machine-generated text.

Second, computer functionality is further improved by the way the negative examples of machine-generated documents are selected. In a first exemplary setting, the negative examples are automatically selected with respect to the collection of documents. In this first exemplary setting, the classifier ensemble can be trained without supervision. In a second exemplary setting, the negative examples are annotated by reference to a set of human-authored documents separate from the collection of documents. Even in this second exemplary setting, some degree of unsupervised training can still be achieved since the positive examples are labeled automatically.

Third, the signal provided by the long-repeated substrings contained in the documents fed to the classifier ensemble can be quite weak. Consequently, summing the outputs of the classifiers for obtaining amplified classified output, as disclosed by the embodiments, significantly facilitates the distributional detection process. Moreover, the disclosed embodiments leverage a weak signal, increasing it by adding the full context of the documents of the dataset. Indeed, in one embodiment, a new dataset could be added to an original dataset to find other weak signals.

Fourth, the output of the classifier ensemble can be used by the computer to rank the documents of the dataset according to an extent to which they contain machine-generated text. In one example, the ranking can be performed by obtaining a "vote" from each classifier. Additionally, the computer can use this ranking to generate another dataset of positive and negative examples of machined-generated documents for retraining of the ensemble of classifiers.

Finally, the disclosed distributional detection approach appears to yield very precise results for classifier ensembles trained with datasets developed from document collections obtained with one of several GPT2 language models. For a given document collection obtained with top-k sampling, the precision can, in some settings, be as high as 100%. Moreover, as borne out by the results relating to GP2-medium and GP2-large, detection of machine-generated text with respect to larger language models is not necessarily more difficult than detection of machine-generated text with respect to smaller language models.

Miscellaneous

The foregoing description is merely illustrative in nature and is in no way intended to limit the disclosure, its application, or uses. The broad teachings of the disclosure may be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure may be implemented in and/or combined with features of any of the other embodiments, even if that combination is not explicitly described. In other words, the described embodiments are not mutually exclusive, and permutations of one or more embodiments with one another remain within the scope of this disclosure.

Each module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module. Each module may be implemented using code. The term code, as used above, may include software, firmware, and/or microcode, and may refer to programs, routines, functions, classes, data structures, and/or objects.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The systems and methods described herein may be partially or fully implemented by a special purpose computer created by configuring a general purpose computer to execute one or more particular functions embodied in program code of computer programs. The functional blocks, flowchart components, and other elements described above serve as software specifications, which may be translated into program code of the computer programs by the routine work of a skilled technician or programmer.

The program code of the computer programs include processor-executable instructions that are stored on at least one non-transitory, tangible computer-readable medium. The program code of the computer programs may also include or rely on stored data. The program code of the computer programs may encompass a basic input/output system (BIOS) that interacts with hardware of the special purpose computer, device drivers that interact with particular devices of the special purpose computer, one or more operating systems, user applications, background services, background applications, etc.

The program code of the computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art and are also intended to be encompassed by the following claims.

What is claimed is:

1. A computer-implemented method implemented with one or more processors for detecting machine-generated documents for identifying false information in a collection of documents including both machine-generated and human-authored documents as well as repeated substrings, comprising:
    (a) for the collection of documents, computing with the one or more processors a set of repeated substrings with each repeated substring having at least a selected length and where the set of repeated substrings comprise super-maximal repeats with each super-maximal repeat comprising a repeated substring that does not occur in any other repeated substring within the collection of documents;
    (b) using a subset of the set of repeated substrings to designate documents containing the subset of the repeated substrings as machine-generated documents, the documents designated as machine-generated comprising positive examples of machine-generated documents;
    (c) developing with the one or more processors negative examples of machine-generated documents, the negative examples of machine-generated documents including at least one human-authored document;
    (d) creating with the one or more processors a dataset comprising both the positive and negative examples of machine-generated documents;
    (e) training with the one or more processors a plurality of automatic binary classifiers by feeding the dataset as input to the plurality of automatic binary classifiers, the plurality of automatic binary classifiers outputting predictions responsive to said feeding that vary as a function of an extent to which the documents of the dataset contain machine-generated text; and
    (f) summing with the one or more processors outputted predictions of each document to obtain an amplified signal for each document fed to the plurality of automatic binary classifiers;
    (g) identifying false information based on machine generated documents detected using the amplified signal for each document fed to the plurality of automatic binary classifiers;
    wherein conditioned on the predictions outputted at (e): repeating (d) to create an additional dataset after repeating (b)-(d); repeating (e) to retrain the plurality of automatic binary classifiers using the additional dataset; repeating (f) using the plurality automatic binary classifiers retrained using the additional dataset; and repeating (g) using the amplified signal for each document fed to the plurality of automatic binary classifiers retrained using the additional dataset.

2. The computer-implemented method of claim 1, wherein the length of each repeated substring in the subset of repeated substrings includes a length of characters.

3. The computer-implemented method of claim 2, wherein the length of each repeated substring in the subset of repeated substrings is at least twenty characters.

4. The computer-implemented method of claim 3, wherein the repeated substrings of the subset of repeated substrings occur at least three times over the collection of documents.

5. The computer-implemented method of claim 1, wherein said developing comprises selecting the negative examples of machine-generated documents from the full collection of documents.

6. The computer-implemented method of claim 5, wherein, responsive to said using a subset and said developing, said training is performed in an unsupervised setting.

7. The computer-implemented method of claim 1, wherein said developing comprises selecting with the one or more processors the negative examples of machine-generated documents from a set of human-authored documents, the set of human-authored documents being separate from the collection of documents.

8. The computer-implemented method of claim 7, wherein, responsive to said using a subset, said training is performed in a partially unsupervised manner.

9. The computer-implemented method of claim 1 in which said using a subset includes designating with the one or more processors a first number of documents and said developing includes developing a second number of documents, wherein the first number is equal to the second number.

10. The computer-implemented method of claim 1, wherein said computing comprises computing with the one or more processors the set of super-maximal repeats with a suffix tree.

11. The computer-implemented method of claim 1, in which the plurality of automatic binary classifiers output a set of votes responsive to each document fed to the automatic binary classifiers, wherein said summing using the predictions includes summing with the one or more processors the set of votes for each document in the dataset to obtain the amplified prediction for each document fed to the plurality of automatic binary classifiers.

12. The computer-implemented method of claim 1, further comprising:
  summing with the one or more processors the predictions for each document fed to the plurality of automatic binary classifier to obtain a set of scores; and
  using with the one or more processors the set of scores to rank the documents of the dataset wherein documents that are not detected as machine-generated possess lower scores than documents that are detected as machine-generated.

13. The computer-implemented method of claim 12, in which the dataset comprises a first dataset including both the positive and negative examples of machine-generated documents, further comprising:
  using with the one or more processors the set of scores to develop a second dataset including both second positive examples of machine-generated documents and second negative examples of machine-generated documents; and
  retraining with the one or more processors the plurality of automatic binary classifiers by feeding the second dataset as input to the plurality of automatic binary classifiers, the plurality of automatic binary classifiers outputting predictions responsive to said feeding of the second dataset.

* * * * *